US012693475B2

(12) United States Patent
Roth et al.

(10) Patent No.: US 12,693,475 B2
(45) Date of Patent: Jul. 28, 2026

(54) INTEGRATED PHOTONIC 2×3 COUPLER

(71) Applicant: Cisco Technology, Inc., San Jose, CA (US)

(72) Inventors: Jonathan Edgar Roth, San Jose, CA (US); Qianfan Xu, San Jose, CA (US); Long Chen, Marlboro, NJ (US)

(73) Assignee: Cisco Technology, Inc, San Jose, CA (US)

( * ) Notice: Subject to any disclaimer, the term of this patent is extended or adjusted under 35 U.S.C. 154(b) by 322 days.

(21) Appl. No.: 18/325,909

(22) Filed: May 30, 2023

(65) Prior Publication Data

US 2024/0402430 A1 Dec. 5, 2024

(51) Int. Cl.
| | |
|---|---|
| *G02B 6/293* | (2006.01) |
| *G02B 6/12* | (2006.01) |
| *G02B 6/122* | (2006.01) |
| *G02B 6/126* | (2006.01) |
| *G02B 6/136* | (2006.01) |

(Continued)

(52) U.S. Cl.
CPC ....... *G02B 6/29355* (2013.01); *G02B 6/1228* (2013.01); *G02B 6/126* (2013.01); *G02B 6/274* (2013.01); *G02B 6/2773* (2013.01); *G02B 6/2821* (2013.01); *G02B 6/29344* (2013.01); *G02B 6/29395* (2013.01); *G02F 1/212* (2021.01); *G02F 1/225* (2013.01); *G02F 1/3132* (2013.01); *G02B 2006/12097* (2013.01); *G02B 2006/12147* (2013.01); *G02B 6/136* (2013.01)

(58) Field of Classification Search
CPC .... G02B 6/1228; G02B 6/125; G02B 6/2835; G02B 6/126; G02B 6/14; G02B 2006/12152; G02B 2006/1215; G02B 6/2773; G02B 6/2843
See application file for complete search history.

(56) References Cited

U.S. PATENT DOCUMENTS

| | | | |
|---|---|---|---|
| 5,339,372 A | 8/1994 | Miller et al. | |
| 2022/0206224 A1* | 6/2022 | Oka ..................... | G02B 6/2726 |

(Continued)

FOREIGN PATENT DOCUMENTS

| | | | |
|---|---|---|---|
| EP | 0628839 B1 | 7/1999 | |
| EP | 4141501 A1 * | 3/2023 | ........... G02B 6/2938 |

OTHER PUBLICATIONS

Extended European Search Report for Application No. 24177194.8, mailed Jan. 16, 2025.

*Primary Examiner* — Michelle R Connelly

(74) *Attorney, Agent, or Firm* — Patterson + Sheridan, LLP

(57) ABSTRACT

Disclosed is an adiabatic optical coupler. The adiabatic optical coupler includes a tapered input region which includes a first waveguide core and a second waveguide core. The first and second waveguide cores are separated at the tapered input region. The adiabatic optical coupler also includes a narrow coupling region extending from the tapered input region. In the narrow coupling region, the first and second waveguide cores are brought within close proximity and a third waveguide core is positioned between the first and second waveguide cores. The third waveguide core defines a longitudinal axis. The adiabatic optical coupler also includes a flared output region extending from the narrow coupling region. In the flared output region, the first, second, and third waveguide cores are separated.

11 Claims, 17 Drawing Sheets

(51) Int. Cl.
    *G02B 6/27*           (2006.01)
    *G02B 6/28*           (2006.01)
    *G02F 1/21*           (2006.01)
    *G02F 1/225*        (2006.01)
    *G02F 1/313*        (2006.01)

(56)            References Cited

U.S. PATENT DOCUMENTS

2023/0062578 A1*   3/2023   Mahmoud .......... G02B 6/29385
2023/0083232 A1*   3/2023   Toda ..................... G02B 6/125
                                                  385/43

* cited by examiner

700

708

708   706

702

702

920 um

708

702

702

704

1500A
1502
1504
FIG. 15A
1500B
1506
1508
1510
FIG. 15B
1600A
1602
1604
FIG. 16A
1600B
1606
1608
1610
FIG. 16B
1700A
1702
1704
FIG. 17A
1700B
1706
1708
1710
FIG. 17B
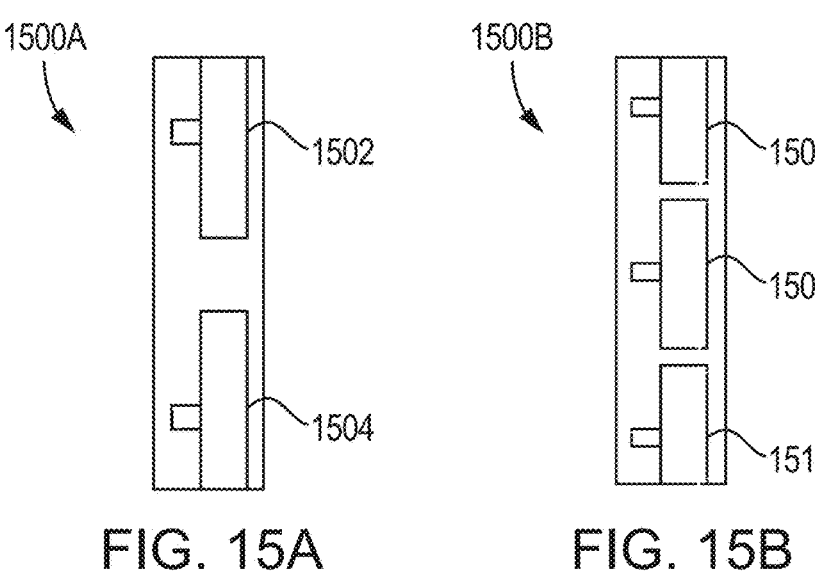
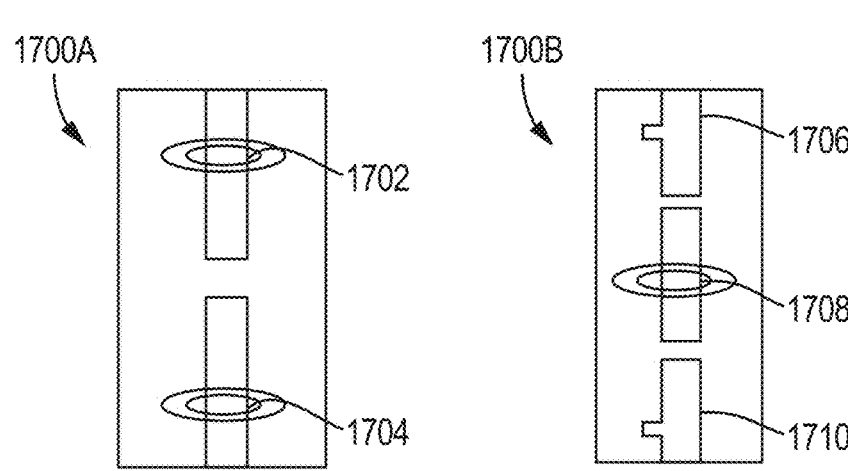

INTEGRATED PHOTONIC 2×3 COUPLER

FIELD

This disclosure relates generally to the field of photonic systems and more particularly relates to an integrated photonic 2×3 coupler for use within a tunable optical filter (TOF), such as the one manufactured by Acacia.

BACKGROUND

Contemporary optical communications and other photonic systems make extensive use of photonic integrated circuits that are advantageously mass-produced in various configurations for various purposes. One of the components typically used in photonic integrated circuits are referred to herein as couplers, or splitters. These may have a number of configurations, although the present disclosure often references 1×2, 2×2, and 2×3 configurations, wherein a 1×2 coupler comprises a single input and two outputs and wherein a 2×2 coupler comprises two inputs and two outputs, and so on. In a general sense, these couplers, or splitters, are used between cascaded Mach Zehnder Interferometer (MZI) filter stages to construct a tunable optical filter (TOF) system. In should be noted that the terms "MZI filter" and "tunable optical filter" may be used interchangeably herein and are to be understood as referencing the same system.

One of the largest problems stemming from the use of conventional couplers, or splitters, is the significant area that they require on a chip. A conventional pair of 2×2 couplers is typically around 920 microns in length, which requires a significant amount of space on a chip. Additionally, a long propagation length within a photonic integrated circuit increases the attenuation of an optical signal relative to attenuation over a shorter propagation length. One alternative method for attempting to reduce the area as required by a conventional pair of 2×2 couplers is to fold an MZI filter stage, however, this results in an uncertainty in targeting the path length difference in each MZI filter stage, as well as increased attenuation due to increased propagation length. Thus, the present disclosure takes a new approach which merges a combiner, a drop port (or, alternatively, a monitor photodiode), and a splitter into one 2×3 coupler that is expected to reduce the required area by two to three times.

SUMMARY

In part, in one aspect, the disclosure relates to an adiabatic optical coupler, comprising a tapered input region comprising a first waveguide core and a second waveguide core separated by a distance; a narrow coupling region extending from the tapered input region, wherein the first waveguide core and the second waveguide core are brought into close proximity, and wherein a third waveguide core is positioned between the first waveguide core and the second waveguide core, the third waveguide core defining a longitudinal axis; and a flared output region extending from the narrow coupling region, wherein the first waveguide core, the second waveguide core, and the third waveguide core are separated. In one aspect of the adiabatic optical coupler, light entering the first waveguide core and the second waveguide core at the tapered input region comprises a TE0 mode (in-phase) component and a TE1 mode (out-of-phase) component. In one aspect of the adiabatic optical coupler, the TE0 mode (in-phase) component is routed to the third waveguide core, and the TE1 mode (out-of-phase) component remains on the first waveguide core and the second waveguide core. In one aspect of the adiabatic optical coupler, in the narrow coupling region, power in the TE0 mode peaks along the longitudinal axis aligning with the third waveguide core, and power in the TE1 mode has a null along the longitudinal axis aligning with the third waveguide core and has two peaks above and below the longitudinal axis aligning with the first waveguide core and the second waveguide core. In one aspect of the adiabatic optical coupler, the tapered input region, the narrow coupling region, and the flared output region are symmetric about the longitudinal axis. In one aspect of the adiabatic optical coupler, the third waveguide core widens as it extends from the narrow coupling region to the flared output region. In one aspect of the adiabatic optical coupler, the first waveguide core is a rib surrounded by a first slab portion and the second waveguide core is a rib surrounded by a second slab portion at the tapered input region; the first waveguide core, the second waveguide core, and the third waveguide core are ribs surrounded by a single slab portion at the narrow coupling region; and the first waveguide core is a rib surrounded by a first slab portion, the second waveguide core is a rib surrounded by a second slab portion, and the third waveguide core is a rib surrounded by a third slab portion at the flared output region. In part, in one aspect, the disclosure relates to a multimode interference optical coupler, comprising a tapered input region comprising a first input waveguide core and a second input waveguide core separated by a distance; an interference propagation region extending from the tapered input region; and a flared output region extending from the interference propagation region; wherein the interference propagation region acts as a multimode waveguide core to combine light from the first input waveguide core and the second input waveguide core; and wherein the flared output region comprises a plurality of output waveguides comprising a first output waveguide core, a second output waveguide core, and a third output waveguide core; wherein the third output waveguide core defines a longitudinal axis; and wherein the interference propagation region has a length calculated to efficiently couple the light from the multimode waveguide core into the first output waveguide core, the second output waveguide core, and the third output waveguide core. In one aspect of the multimode interference optical coupler, the interference propagation region has a length defined by $3L_{\pi}/8$, wherein $L_{\pi}$ is a beat length of two lowest order modes. In one aspect of the multimode interference optical coupler, the first output waveguide core and the third output waveguide core are separated by a width defined by $W_e/4$, wherein $W_e$ is an effective width of the interference propagation region, the third output waveguide core and the second output waveguide core are separated by a width defined by $W_e/4$, and the first input waveguide core and the second input waveguide core are separated by a width defined by $W_e/2$. In one aspect of the multimode interference optical coupler, the first input waveguide core and the second input waveguide core are single-mode inputs, the interference propagation region comprises a multimode interference pattern, and the first output waveguide core, the second output waveguide core, and the third output waveguide core are single-mode outputs. In one aspect of the multimode interference optical coupler, a decoupling region is positioned between the interference propagation region and the flared output region to adiabatically separate spatially overlapping output modes. In one aspect of the multimode interference optical coupler, the tapered input region, the interference propagation region, and the flared output region are symmetric about the longitudinal axis. In part, in one aspect, the disclosure relates to a tunable optical filter system, comprising a system input; a 1×2 input coupler, wherein the 1×2 input coupler receives light from the system input and splits the light into a first system input and a second system input; a plurality of Mach-Zehnder interferometer (MZI) filter stages cascaded in series, each MZI filter stage comprising: a first path comprising a first path length; a second path comprising a second path length, wherein the second path length is greater than the first path length; and a 2×3 interferometer, wherein the 2×3 interferometer receives light from a first input and a second input, combines the light from the first input and the second input interferometrically into an in-phase combination and an out-of-phase combination, and outputs half of the out-of-phase combination to a first output, the other half of the out-of-phase combination to a second output, and the in-phase combination to a third output; wherein, a first MZI filter stage, the first path receives light from the first system input and the second path receives light from the second system input, and wherein, any MZI filter stage subsequent to the first MZI filter stage, the first path receives light from the first output of a preceding MZI filter stage and the second path receives light from the second output of the preceding MZI filter stage; and a system output, wherein the system output comprises the first output, the second output, and the third output of a final MZI filter stage. In one aspect of the tunable optical filter system, the 2×3 interferometer is an adiabatic optical coupler, comprising a tapered input region comprising a first waveguide core and a second waveguide core separated by a distance; a narrow coupling region extending from the tapered input region, wherein the first waveguide core and the second waveguide core are brought into close proximity, and wherein a third waveguide core is positioned between the first waveguide core and the second waveguide core, the third waveguide core defining a longitudinal axis; and a flared output region extending from the narrow coupling region, wherein the first waveguide core, the second waveguide core, and the third waveguide core are separated. In one aspect of the tunable optical filter system, the 2×3 interferometer is a multimode interference optical coupler, comprising a tapered input region comprising a first input waveguide core and a second input waveguide core separated by a distance; an interference propagation region extending from the tapered input region; and a flared output region extending from the interference propagation region; wherein the interference propagation region acts as a multimode waveguide core to combine light from the first input waveguide core and the second input waveguide core; wherein the flared output region comprises a plurality of output waveguides comprising a first output waveguide core, a second output waveguide core, and a third output waveguide core; wherein the third output waveguide core defines a longitudinal axis; and wherein the interference propagation region has a length calculated to efficiently couple the light from the multimode waveguide core into the first output waveguide core, the second output waveguide core, and the third output waveguide core.

In one aspect of the tunable optical filter system, the tunable optical filter further comprises at least one of a first phase shifter positioned over the first path and a second phase shifter positioned over the second path.

In one aspect of the tunable optical filter system, the third output transmits light to a monitor photodiode, wherein the monitor photodiode is used to monitor and control phases of the transmitted light. In one aspect of the tunable optical filter system, a plurality of electrical contact pads are positioned in close proximity to the plurality of MZI filter stages cascaded in series. In one aspect of the tunable optical filter system, the plurality of MZI filter stages cascaded in series further comprise 90-degree bends to reduce a required area on a chip. Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, passivation coatings/layers, optical paths, waveguides, splitters, couplers, combiners, electro-optical devices, inputs, outputs, ports, channels, components and parts of the foregoing disclosed herein can be used comprising laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which:

FIG. 15A is a schematic diagram showing the two input waveguides of a 2×3 interferometer. FIG. 15B is a schematic diagram showing the three outputs of a 2×3 interferometer.

FIG. 16A is a schematic diagram that shows the TE1 mode (out-of-phase component) at the inputs of a 2×3 interferometer. FIG. 16B is a schematic diagram that shows the TE1 mode (out-of-phase component) at the outputs of a 2×3 interferometer.

FIG. 17A is a schematic diagram that shows the TE0 mode (in-phase component) at the inputs of a 2×3 interferometer. FIG. 17B is a schematic diagram that shows the TE0 mode (in-phase component) at the outputs of a 2×3 interferometer.

DETAILED DESCRIPTION

This disclosure generally relates to 2×3 interferometers that merge the combiner, drop port, and splitter of an MZI filter stage into a single component in order to reduce the area required on a chip and to reduce the currently-required extra propagation length.

Figures 1, 2:
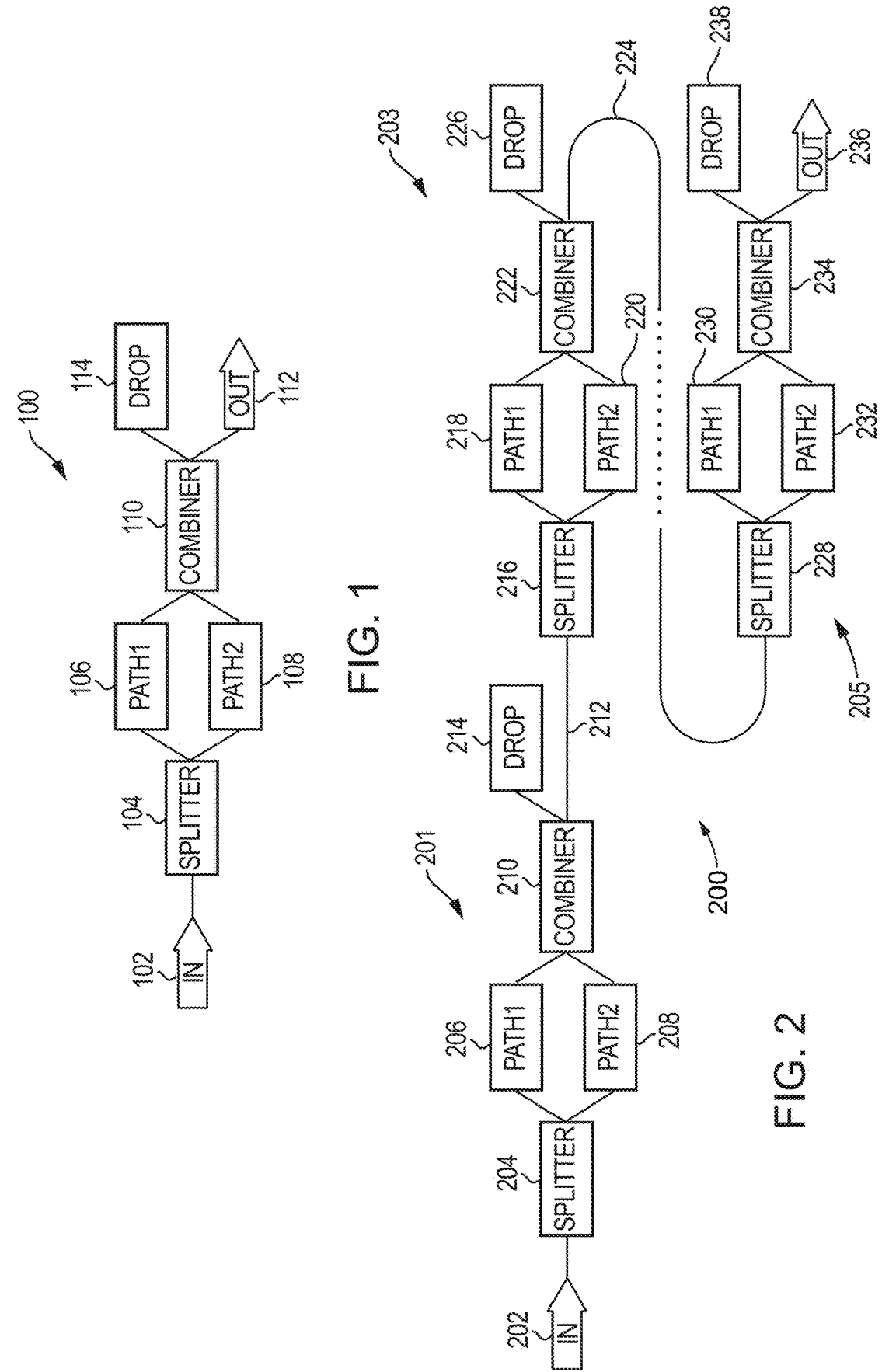
FIG. 1 is a schematic diagram of a single MZI filter stage.
FIG. 2 is a schematic diagram of multiple cascaded MZI filter stages.

With reference now to the figures, FIG. 1 is a schematic diagram of a single MZI filter stage 100 that may be cascaded together with several other MZI filter stages. In this case, light enters the MZI filter stage 100 via input 102. Following the input 102, splitter 104 splits the light into two paths, PATH1 106 and PATH2 108, where the light is propagated a different distance along the two paths. The light is then recombined interferometrically via combiner 110. Finally, the MZI filter stage 100 separates the in-phase combination and the out-of-phase combination of the two paths. One will be outputted via output 112 as the input to the next MZI filter stage. The other is dropped via drop 114, or may, alternatively, be sent to a monitor photodiode.

FIG. 2 is a schematic diagram of a system 200 including multiple cascaded MZI filter stages 201, 203, and 205. Light enters the system 200 via input 202. Following the input 202, splitter 204 splits the light into two paths, PATH1 206 and PATH2 208, where the light is propagated a different distance along the two paths. The light is then recombined interferometrically via combiner 210. Finally, MZI filter stage 201 separates the in-phase combination and the out-of-phase combination of the two paths. One is output as the input to MZI filter stage 203 via line 212. The other is dropped via drop 214, or may, alternatively, be sent to a monitor photodiode. The light then travels into splitter 216 where it is split into two paths, PATH1 218 and PATH2 220, and where it is propagated a different distance along the two paths. The light is then recombined interferometrically via combiner 222. Finally, MZI filter stage 203 separates the in-phase and out-of-phase combination of the two paths. One is output as the input to MZI filter stage 205 via line 224. The other is dropped via drop 226, or may, alternatively, be sent to a monitor photodiode. The light then travels into splitter 228 where it is split into two paths, PATH1 230 and PATH2 232, and where it is propagated a different distance along the two paths. The light is then recombined interferometrically via combiner 234. Finally, MZI filter stage 205 separates the in-phase combination and out-of-phase combination of the two paths. One is output via output 236 as the input to the next MZI filter stage. The other is dropped via drop 238, or may alternatively be sent to a monitor photodiode.

It should be noted that FIGS. 1 and 2 are simply representations of the elements that MZI filter stages comprise and how multiple MZI filter stages are cascaded to construct a tunable optical filter. FIGS. 1 and 2 should not, in any way, be construed as limiting the number of MZI filter stages per tunable optical filter to one or three, respectively. Furthermore, it should be noted that inputs 102 and 202 are not necessarily the first input of their respective tunable optical filters, and outputs 112 and 236 are not necessarily the last output of their respective tunable optical filters.

Figure 3:
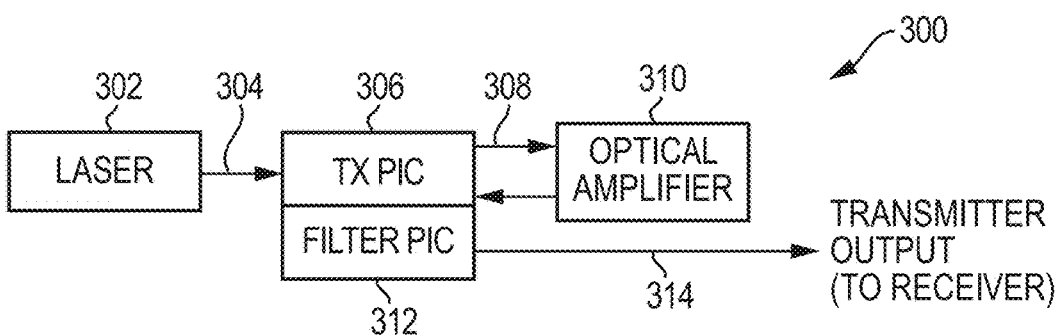
FIG. 3 is a schematic diagram showing a silicon photonics implementation.

FIG. 3 is a schematic diagram showing a silicon photonics implementation 300 wherein the light generation and amplification is off-chip. The laser 302 generates optical carrier 304 which is transmitted to transmitter PIC 306, also referred to herein as TX PIC 306. The transmitter PIC 306 then modulates the optical carrier 304 and generates an optical signal 308. An optical amplifier 310 then amplifies the optical signal 308 and introduces spontaneous emission noise. Finally, a tunable optical filter 312, which may be on the same PIC, removes out-of-band noise and cleans up the optical signal 308 before transmitting an output 314.

Figure 4:
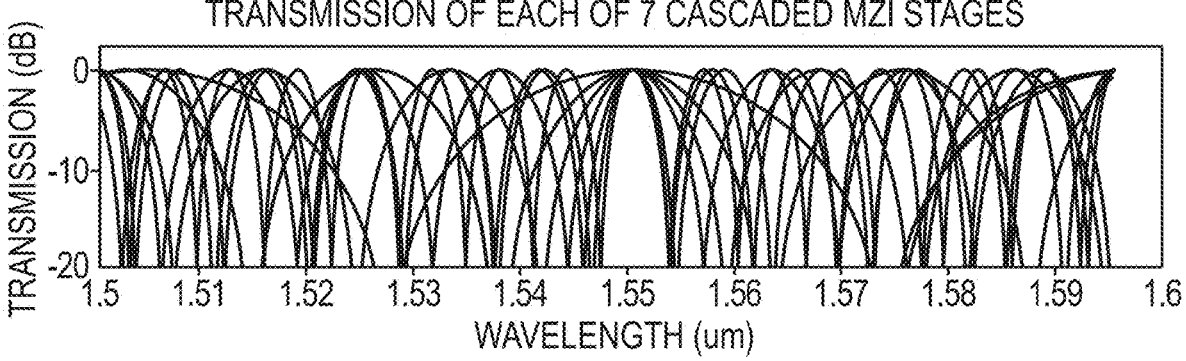
FIG. 4 is a plot showing the individual transmission of seven cascaded MZI filter stages.
Figure 5:
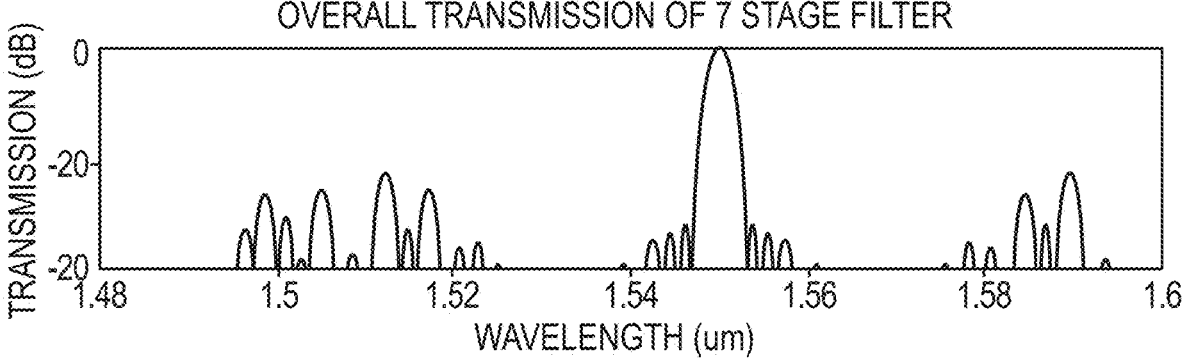
FIG. 5 is a plot showing the overall transmission of a seven-stage MZI filter.

FIG. 4 is a plot showing the individual transmission of seven cascaded MZI filter stages. FIG. 5 is a plot showing the overall transmission of a seven-stage MZI filter. In both FIGS. 4 and 5, each stage of the MZI filter has a different delay between two paths due to different path lengths in each MZI filter stage. Furthermore, monitoring the MZI filter and gathering optical feedback is used to tune the relative phase of the two paths at each MZI filter stage.

Figure 6:
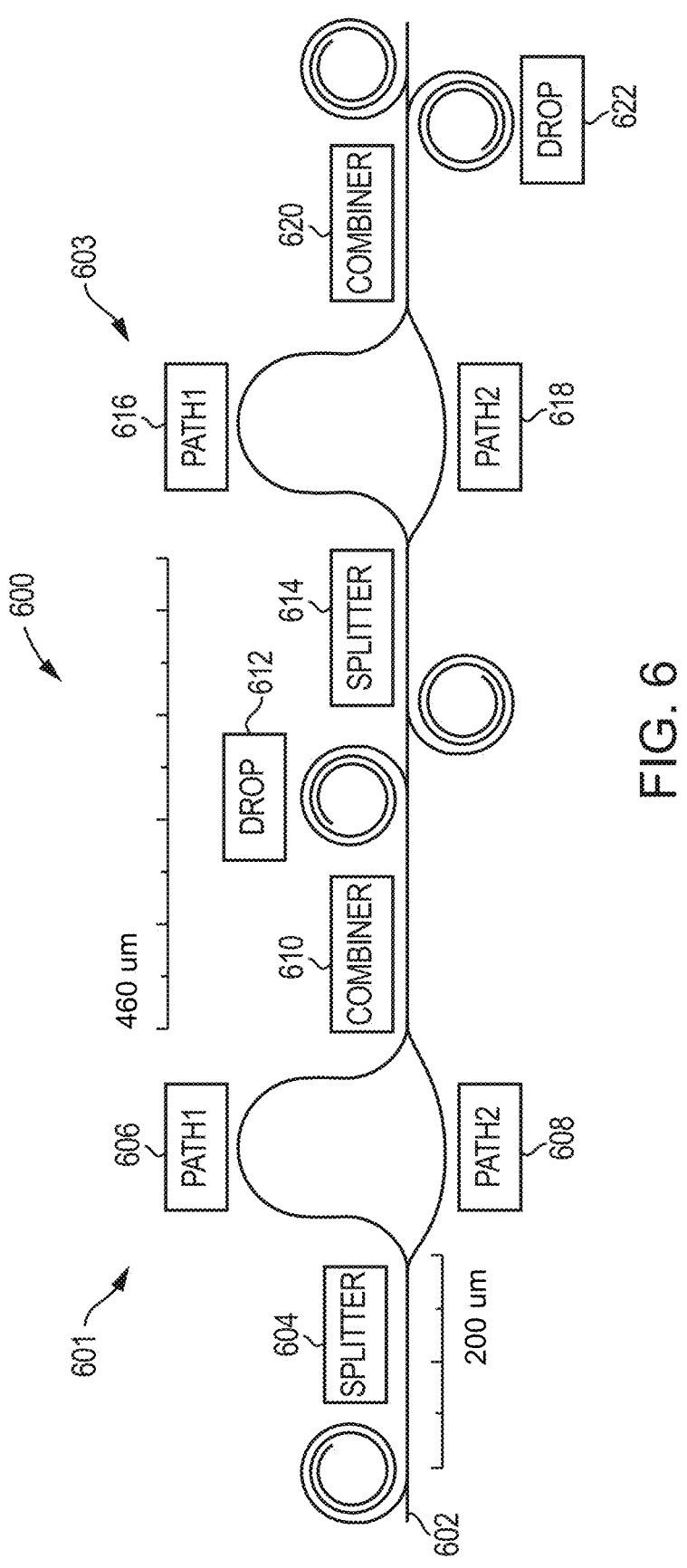
FIG. 6 is a schematic diagram of two cascaded MZI filter stages in a silicon photonic integrated circuit (PIC).

FIG. 6 is a schematic diagram showing two stages, 601 and 603, of an MZI filter 600 in a silicon photonic integrated circuit (PIC). Light enters the first stage 601 via input 602. Following the input 602, splitter 604 splits the light into two paths, PATH1 606 and PATH2 608, where the light is propagated a different distance along the two paths. The light is then recombined interferometrically via combiner 610. Finally, the first stage 601 separates the in-phase combination and the out-of-phase combination of the two paths. One is output as the input to the second stage 603. The other is dropped via drop 612, or may, alternatively, be sent to a monitor photodiode. The light then travels into splitter 614 where it is split into two paths, PATH1 616 and PATH2 618, where it is propagated a different distance along the two paths. The light is then recombined interferometrically via combiner 620. Finally, the second stage 603 separates the in-phase combination and the out-of-phase combination of the two paths. One is output as the input to the next MZI filter stage. The other is dropped via drop 622, or may, alternatively, be sent to a monitor photodiode.

It should be noted that FIG. 6 is simply a representation of how multiple MZI filter stages are cascaded to construct an optical filter and should not be construed as limiting the number of MZI filter stages per optical filter to two. Furthermore, it should be noted that the input of MZI filter stage 601 is not necessarily the first input of the tunable optical filter, and the output of MZI filter stage 603 is not necessarily the last output of the tunable optical filter.

Additionally, it should be noted that when constructing a tunable optical filter comprising several cascaded MZI filter stages, the different MZI filter stages may be reordered or rearranged without changing the functionality of the tunable optical filter. For example, with regard to FIG. 6, conventional stages 601 and 603 may swap positions in the MZI filter 600 and the overall functionality will remain the same. This concept applies to the various other tunable optical filters, or MZI filters, shown and discussed herein the present disclosure.

In the above disclosed FIG. 6, the splitters, 604 and 614, and the combiners, 610 and 620, are adiabatic components which are used in optical communications for low loss, low back reflection, fabrication tolerance, and wide bandwidth advantages. Furthermore, in the above disclosed FIG. 6, the splitters, 604 and 614, and the combiners, 610 and 620, are the same design of an adiabatic 2×2 coupler. Lastly, it should be noted that phase shifters, which are placed over at least one of the two paths in each stage, are not shown in FIG. 6.

Furthermore, in the above disclosed FIG. 6, several rulers are provided to indicate the length, in microns (i.e., um), of the above identified components. Most notably, the center ruler discloses that the combiner 610, drop 612, and splitter 614 total a length of 458.82 um. This is the length of one 2×2 coupler. However, in conventional uses, two 2×2 couplers are used in a row, totaling a combined length of nearly 920 um. As a result, a significant amount of area is required on a chip for these pairs of 2×2 couplers. The present disclosure provides a solution by way of the disclosed invention.

Figure 7:
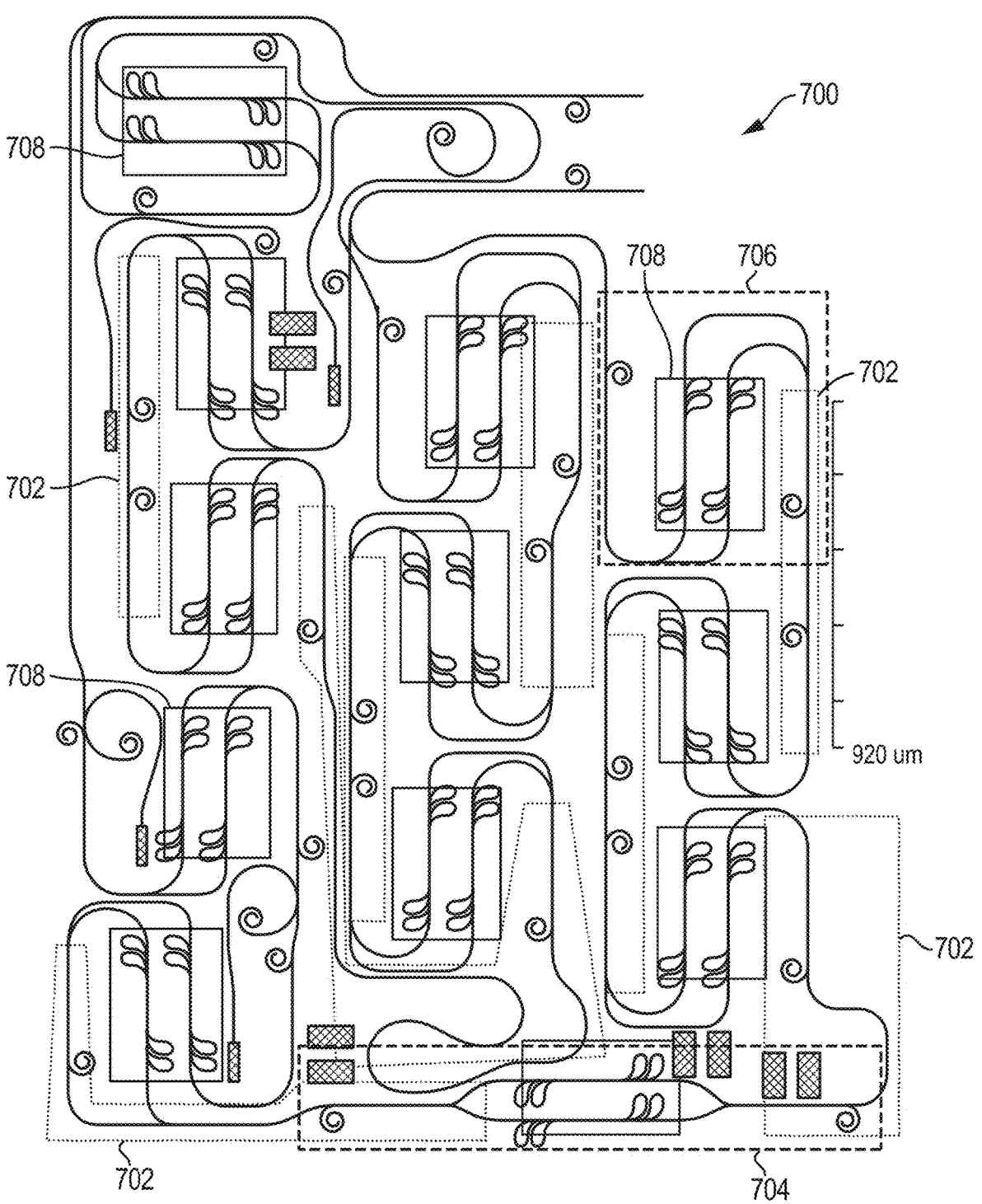
FIG. 7 is a schematic diagram showing a conventional tunable optical filter (TOF) system from a PIC.

FIG. 7 is a schematic diagram showing a tunable optical filter (TOF) 700 from a PIC. This TOF comprises several different elements, though namely pairs of 2×2 couplers 702 that are between cascaded MZI filters, such as those identified by the dashed box 704 and dashed box 706, wherein dashed box 704 is an MZI filter in a straight configuration and wherein dashed box 706 is an MZI filter in a folded configuration. The pairs of 2×2 couplers 702 can be replaced with the disclosed invention. FIG. 7 further comprises interferometer arms 708 which contain thermo-optic phase shifters (TOPS) used to tune the TOF 700. The above-disclosed 2×2 couplers 702 are long and require a significant amount of space, increasing the total area required for the chip and increasing attenuation of the signal associated with increased propagation length. A folded configuration, as disclosed by dashed box 706, helps to save space, however this lengthens the interferometer arms 708 which further increases the uncertainty in targeting the path length difference between the arms in each MZI filter stage and further increases attenuation of the signal associated with increased propagation length. The disclosed invention provides a solution by merging the combiner, drop port, and splitter into one component which will greatly reduce the area required on the chip. That is, in the TOF application, a presently disclosed 2×3 interferometer that is 115 microns long will replace two 2×2 couplers which have a combined length around 920 microns. The disclosed invention also allows for the separation of the in-phase and out-of-phase components along separate paths in each MZI filter stage. Finally, the disclosed invention also allows for 50/50 splitting of the out-of-phase component into two separate outputs.

It should be noted that there are several pairs of 2×2 couplers 702 and interferometer arms 708 found within the TOF 700 despite only a few having been identified by like numerals. The pairs of 2×2 splitters are generally identified by a dotted box similar to those already labeled "702". The pairs of interferometer arms 708 are generally identified by a solid box similar to those already labeled "708". Furthermore, this TOF 700 comprises several folded configurations despite only one having been identified. The others are not similarly identified by the dashed box 706, however, one having ordinary skill in the art would be able to easily identify the folded configurations that occur throughout this PIC.

Figures 8, 9:
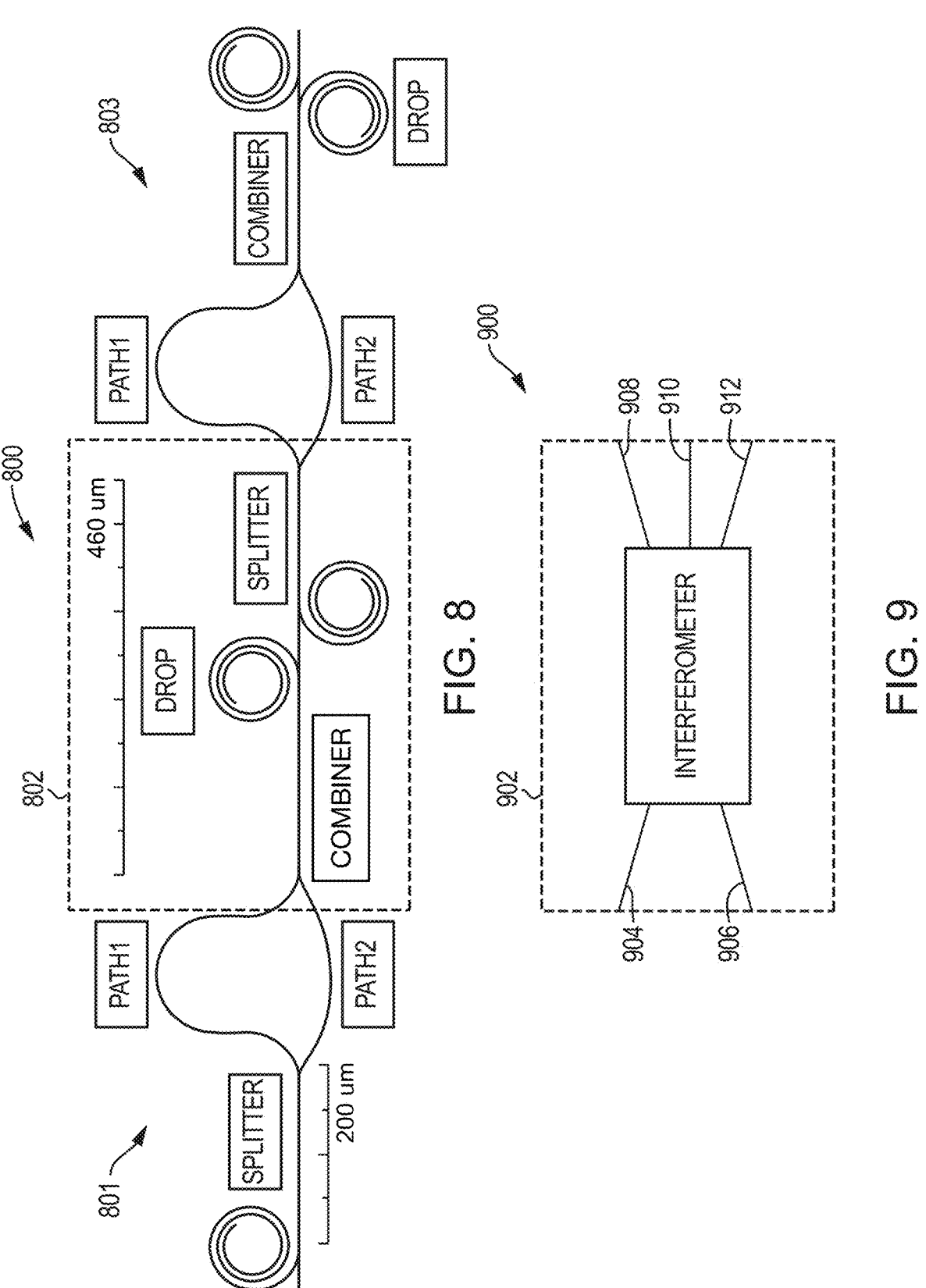
FIG. 8 is a schematic diagram showing two cascaded MZI filter stages in a silicon PIC and identifies the components that will be merged into a single component.
FIG. 9 is a schematic diagram showing the disclosed invention, a 2×3 interferometer.

FIG. 8 is a schematic diagram showing two stages, 801 and 803, of an MZI filter 800 in a silicon PIC and outlines, by the dashed box 802, the components that will be merged together. The components and disclosure of FIG. 8 are substantially the same as those disclosed in FIG. 6. The only difference between these two figures is the identification of the components to be merged as outlined by dashed box 802.

FIG. 9 is a schematic diagram showing the disclosed invention, a 2×3 interferometer 900. The dashed box 902 comprises two inputs, 904 and 906, the interferometer which functions as a combiner and a splitter, and the three outputs, 908, 910, and 912, wherein one of the three outputs acts as a drop port. Altogether, this single component, as outlined by the dashed box 902, performs the function of those components outlined by the dashed box 802 in FIG. 8, above, whilst significantly decreasing the required area on a chip. The top output 908 comprises half of the out-of-phase combination of the two inputs. The drop port 910 comprises an in-phase combination of the two inputs. Finally, the bottom output 912 comprises the other half of the out-of-phase combination of the two inputs.

Figure 11:
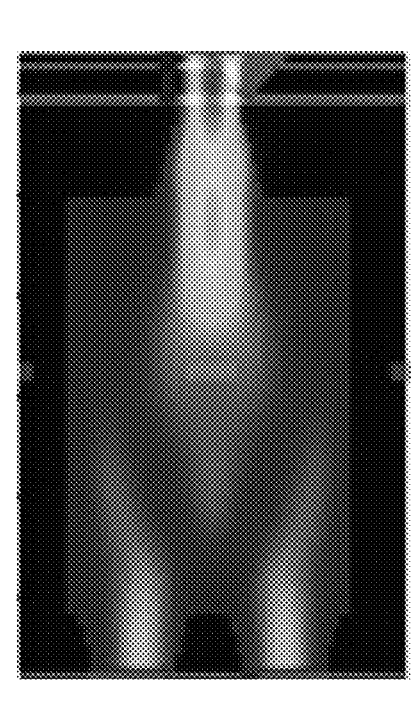
FIG. 11 is an image showing the power density of two in-phase, equal-power inputs from the left of a conventional 2×1 MMI.
Figure 10:
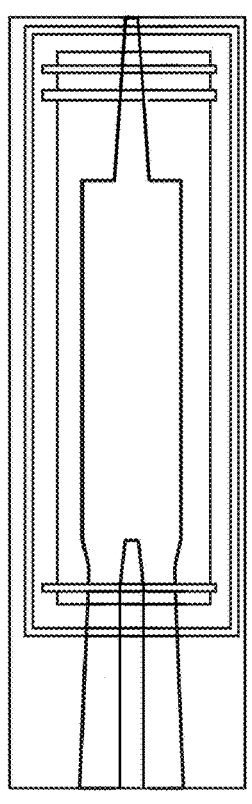
FIG. 10 is a schematic diagram showing a conventional 2×1 multimode interferometer (MMI).
Figure 13:
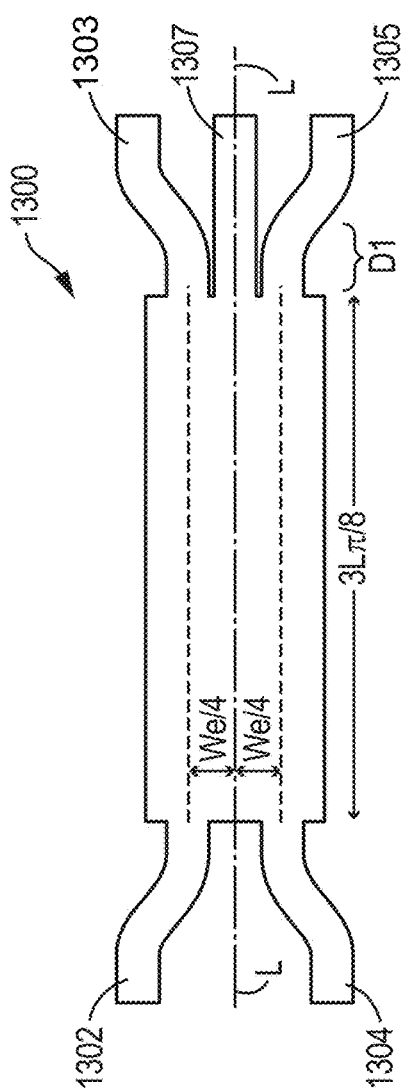
FIG. 13 is a schematic diagram showing one aspect of the disclosed invention, a 2×3 MMI.
Figure 12:
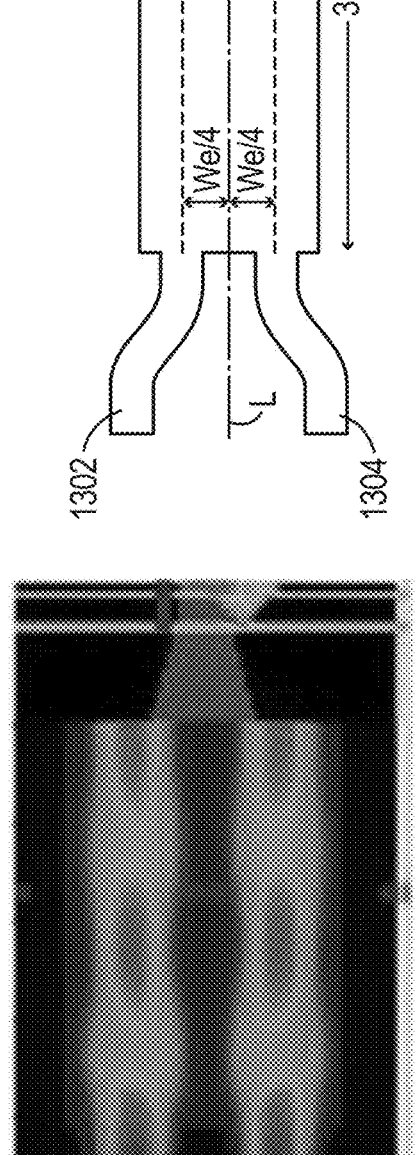
FIG. 12 is an image showing the power density for two 180°-shifted, equal-power inputs from the left of a conventional 2×1 MMI.

FIGS. 10-12, as described below, generally relate to conventional 2×1 MMIs, which are well-known components for splitters, combiners, and interferometers. However, FIG. 13 provides a novel 2×3 MMI for use within a tunable optical filter.

FIG. 10 is a schematic diagram showing a 2×1 multimode interferometer (MMI), as setup for a finite-difference timedomain (FDTD) simulation which models nano-scale optical devices. Light is incident from the left side of the MMI coupler.

FIG. 11 is an image showing the power density of two in-phase, equal-power inputs from the left of a 2×1 MMI. FIG. 11 further illustrates a high power density TE0 mode beginning just after the midpoint of the conventional 2×1 MMI, which eventually turns into the TE0 output at the right. As shown in FIG. 11, the power density is the highest at the rightmost point of the conventional 2×1 MMI as it as output as a TE0 mode.

FIG. 12 is an image showing the power density for two out-of-phase (180°-shifted), equal-power inputs from the left of a 2×1 MMI. FIG. 12 further illustrates a high power density TE1 mode entering the conventional 2×1 MMI at the left, and the TE1 mode having three peak power densities throughout an interference propagation region. FIG. 12 further illustrates that the power density for the TE1 mode is truncated at the end of the interference propagation region.

The present disclosure makes extensive use of the terms "tapered input region" and "flared output region". The purpose of this paragraph is to clearly identify these terms and provide a non-limiting definition as to which they are intended to be understood in the present disclosure. "Tapered input region" is meant to be understood as meaning a region whose inputs, or waveguides and waveguide cores, begin spread apart at an input region and slowly come within close proximity of one another towards a middle region, such as the presently disclosed narrow coupling region or interference propagation region. "Flared output region" is meant to be understood as meaning a region whose outputs, or waveguides and waveguide cores, begin within close proximity of one another at the end of a middle region, such as the presently disclosed narrow coupling region or interference propagation region, and gradually spread apart towards an output region.

FIG. 13 is a schematic diagram showing one aspect of the disclosed invention, a 2×3 MMI 1300, also referred to herein as a multimode interference optical coupler. As shown, the 2×3 MMI has three regions: a tapered input region, an interference propagation region, and a flared output region. The first region, a tapered input region, has two single-mode input waveguide cores, 1302 and 1304, that are separated by a width defined by $W_e/2$, where $W_e$ is the effective width of the interference propagation region. The second region, an interference propagation region, which extends from the first region, acts as a multimode waveguide core with a multimode interference pattern to combine the light from each of the two input waveguide cores, 1302 and 1304, and eventually split the combined light amongst three output waveguide cores, 1303, 1305, and 1307, found in the third region. The third region, a flared output region, which extends from the second region, has three single-mode output waveguide cores that are separated by defined widths: the first output waveguide core 1303 and the third output waveguide core 1307 are separated by $W_e/4$, the third output waveguide core 1307 and the second output waveguide core 1305 are separated by $W_e/4$, and the first output waveguide core 1303 and the second output waveguide core 1305 are separated by $W_e/2$.

Additionally, the third output waveguide core 1307 defines a longitudinal axis, L, for which the tapered input region, the interference propagation region, and the flared output region are all symmetric about. As for the length of the interference propagation region of the presently disclosed 2×3 MMI, it is defined by $3L_\pi/8$, where $L_\pi$ is a beat length of two lowest order modes. That is, the exact length of the 2×3 MMI is substantial. In fact, this length is calculated such that light is coupled to the first, second, and third output waveguide cores most efficiently. If the length of the interference propagation region were different than the calculated length, then the 2×3 MMI would be acting inefficiently. Finally, a decoupling region is positioned between the interference propagation region and the flared output region which, if necessary, adiabatically separates spatially overlapping output modes.

Figures 14, 14A:
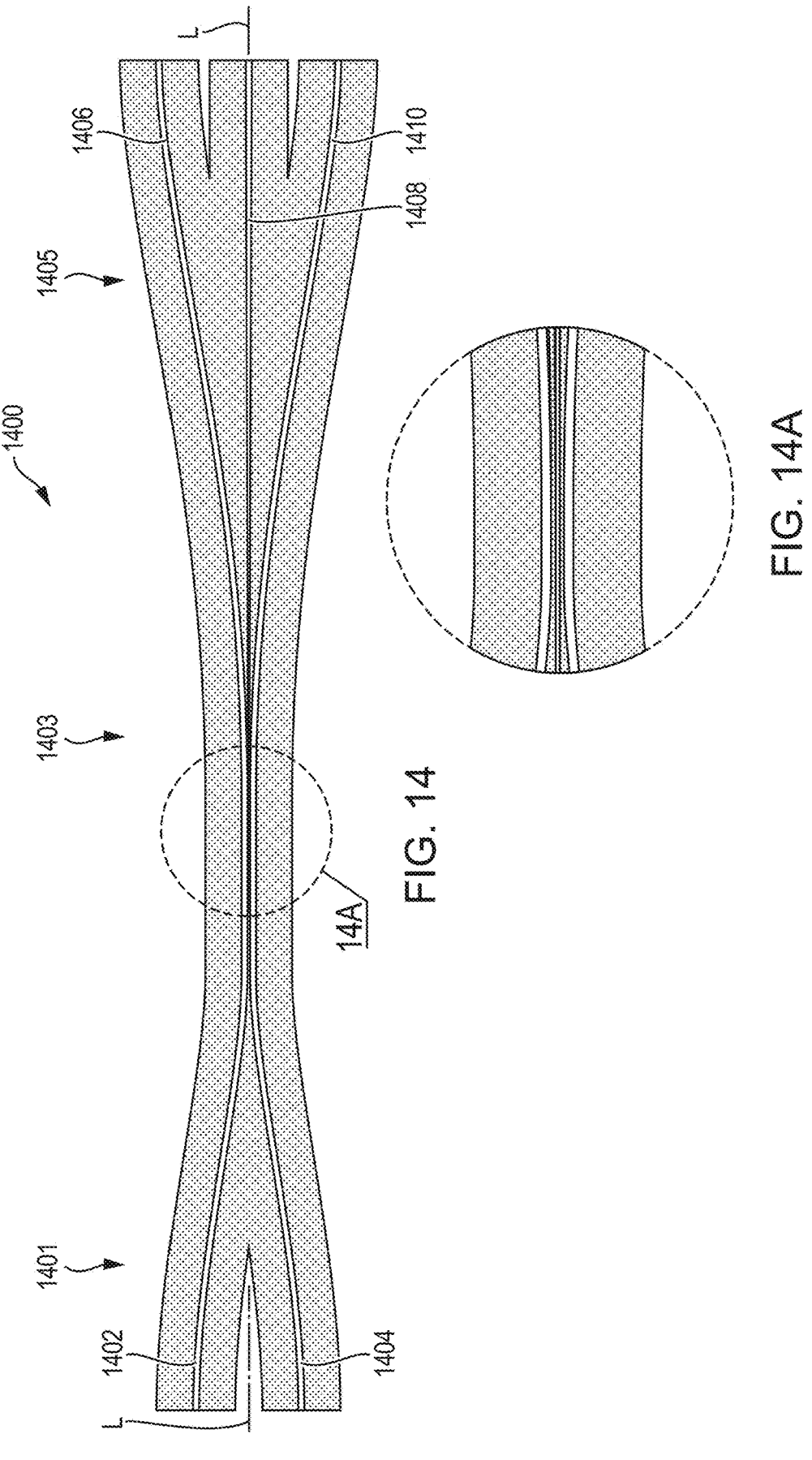
FIG. 14 is a schematic diagram showing one aspect of the disclosed invention, an adiabatic 2×3 coupler.
FIG. 14A is a schematic diagram showing a magnified view of a coupling region of an adiabatic 2×3 coupler.

FIG. 14 is a schematic diagram showing one aspect of the disclosed invention, an adiabatic 2×3 coupler 1400, which comprises a tapered input region 1401, a narrow coupling region 1403, and a flared output region 1405. The tapered input region 1401 comprises a first waveguide core, whose input is 1402, and a second waveguide core, whose input is 1404. At this tapered input region 1401, the two waveguide cores are separated. However, the narrow coupling region 1403 brings these two waveguide cores in close proximity with one another and introduces a third waveguide core that is positioned between the first and second waveguide cores. This third waveguide core begins very narrow at the narrow coupling region and gradually increases in width towards the flared output region. This third waveguide core also defines a longitudinal axis, L, by which the adiabatic 2×3 coupler is symmetric about. Finally, the flared output region 1405 comprises the first waveguide core, whose output is 1406, the second waveguide core, whose output is 1410, and the third waveguide core, whose output is 1408. At this flared output region 1405, the three waveguide cores are separated.

The light entering the adiabatic 2×3 coupler 1400 via inputs 1402 and 1404 comprises an out-of-phase component and an in-phase component. The out-of-phase component is a TE1 mode while the in-phase combination component is a TE0 mode. The TE1 and TE0 modes both begin at the two input waveguide cores, whose inputs are 1402 and 1404, respectively, however, as light propagates through the adiabatic 2×3 coupler 1400, the TE0 mode is routed to the third waveguide core where it is then outputted at output 1408. The TE1 mode remains on the outer waveguides, or the first and second waveguide cores. As a result, power in the TE0 mode peaks along the longitudinal axis on the third waveguide core, while power in the TE1 mode peaks along the first and second waveguide cores which are located above and below the longitudinal axis. Thus, the TE1 mode has a null along the centerline, or the longitudinal axis.

This design particularly takes advantage of mode symmetry. That is, the TE1 mode has a null in the centerline where the third waveguide core is located due to its odd symmetry. Several embodiments of the adiabatic 2×3 coupler 1400 are further identified and described in FIGS. 20-26. This adiabatic implementation has several advantages including, but not limited to, low loss, wide bandwidth, low back reflection, and fabrication tolerance. It should be noted that the function of this adiabatic 2×3 coupler can also be implemented not only with adiabatic devices, but also with interferometric devices, or those that combine adiabatic and interferometric principles.

It should be noted that in some embodiments, the waveguide cores disclosed above, and as shown, are rib waveguides surrounded by a partially etched waveguide layer referred to herein as a slab region. At the tapered input region, the first waveguide core and the second waveguide core are surrounded by their own respective slab portions. However, as these two waveguide cores come within close proximity of one another, and as the third waveguide core is introduced, the individual slab portions join together and the three waveguide cores share a single slab portion in the narrow coupling region. Finally, as these three waveguide cores separate towards the flared output region, they each develop their own respective slab portions. That is, the first waveguide core, the second waveguide core, and the third waveguide core all become surrounded by their own respective slab portions as the waveguide cores reach the flared output region.

For added transparency and clarification, FIG. 14A provides a magnified view of the narrow coupling region 1403 of the adiabatic 2×3 coupler 1400 of FIG. 14 such that the first waveguide core, the second waveguide core, and the third waveguide core can be easily seen in the narrow coupling region.

FIGS. 15A-B are schematic diagrams showing the left end 1500A of a 2×3 interferometer and the right end 1500B of a 2×3 interferometer. FIGS. 15A-B further show the two inputs, or waveguide cores, 1502 and 1504, and the three outputs, or waveguide cores, 1506, 1508, and 1510, of a 2×3 interferometer. Furthermore, the two inputs, 1502 and 1504, and the three outputs, 1506, 1508, and 1510, illustrate a rib waveguide. As shown, each waveguide core, 1502, 1504, 1506, 1508, and 1510 comprises a protruding portion referred to herein as a rib. The thinner part of the core that is above and below the rib is referred to herein as a slab. The key takeaway is light is centered in the rib, which is discussed in greater detail below.

FIGS. 16A-B are schematic diagrams showing the left end 1600A of a 2×3 interferometer and the right end 1600B of a 2×3 interferometer. FIGS. 16A-B further show the two inputs, or waveguide cores, 1602 and 1604, and the three outputs, or waveguide cores, 1606, 1608, and 1610, of a 2×3 interferometer. Similar to FIGS. 15A-B, FIG. 16B illustrates a rib waveguide, as shown by waveguide core 1608. While not shown, it is important to note that waveguide cores 1602, 1604, 1606, and 1610 also comprise a rib similar to waveguide core 1608. Furthermore, FIGS. 16A-B show, by use of contour lines, that the TE1 mode stays on the outer waveguides, or the first and second waveguide cores, during the propagation of light from an input to an output. That is, at the right end 1600B of a 2×3 interferometer, the TE1 mode is found on the outer waveguides, or the first and second waveguide cores (i.e., outputs 1606 and 1610). Similarly, a cross-sectional view at any point in the narrow coupling region would also show that the TE1 mode stays on the outer waveguides, or the first and second waveguide cores. However, one would notice that the TE1 modes come close together, with a null along the centerline, as the outer waveguides, or the first and second waveguide cores, come into close proximity with one another in the narrow coupling region.

FIGS. 17A-B are schematic diagrams showing the left end 1700A of a 2×3 interferometer and the right end 1700B of a 2×3 interferometer. FIGS. 17A-B further show the two inputs, or waveguide cores, 1702 and 1704, and the three outputs, or waveguide cores, 1706, 1708, and 1710, of a 2×3 interferometer. Similar to FIGS. 15A-B and FIG. 16B, FIG. 17B illustrates a rib waveguide, as shown by waveguide cores 1706 and 1710. While not shown, it is important to note that waveguide cores 1702, 1704, and 1708 also comprise a rib similar to waveguide cores 1706 and 1710. Furthermore, FIGS. 17A-B show, by use of contour lines, that the TE0 mode is routed to the center waveguide, or the third waveguide core, during the propagation of light from an input to an output. That is, at the right end 1700B of a 2×3 interferometer, the TE0 mode is found on the center waveguide, or the third waveguide core (i.e., output 1708). Similarly, a cross-sectional view at any point in the narrow coupling region would show that the TE0 mode couples to the center waveguide, or the third waveguide core, and remains on the center waveguide, or the third waveguide core, towards the output.

Figure 18:
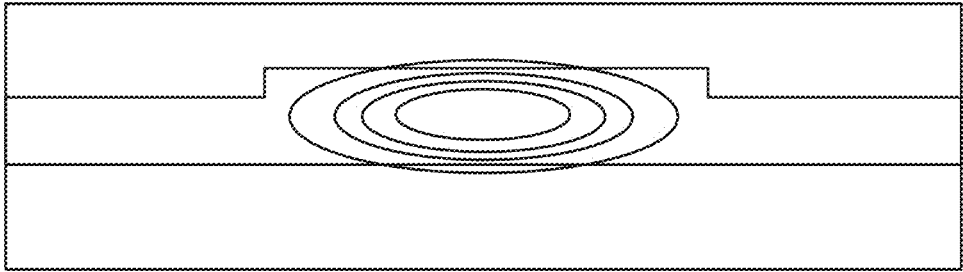
FIG. 18 is a schematic diagram showing an example TE0 mode in a coupling region of a 2×3 interferometer.

FIG. 18 is a schematic diagram illustrating an example TE0 mode. By use of contour lines, FIG. 18 shows that the TE0 mode's intensity peaks along a centerline. It should be noted that FIG. 18 does not represent a combination of mode shape (i.e., contour lines) and waveguide boundaries (i.e., horizontal/vertical lines) in the present disclosure. Rather, FIG. 18 is merely an example to illustrate the concept of a TE0 mode.

Figure 19:
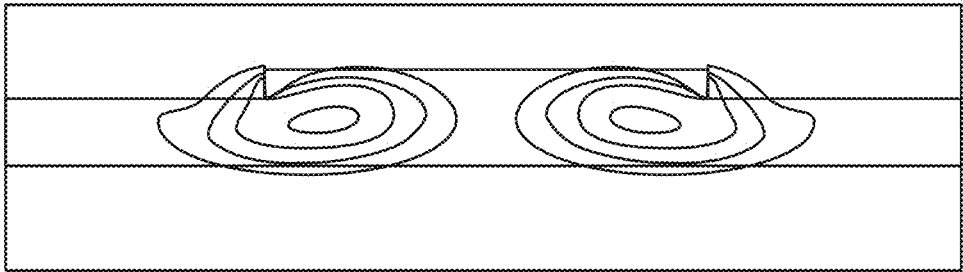
FIG. 19 is a schematic diagram showing an example TE1 mode in a coupling region of a 2×3 interferometer.

FIG. 19 is a schematic diagram illustrating an example TE1 mode. By use of contour lines, FIG. 19 shows that the TE1 mode's intensity does not peak along the centerline and instead comprises a null in the centerline. It should be noted that FIG. 19 does not represent a combination of mode shape (i.e., contour lines) and waveguide boundaries (i.e., horizontal/vertical lines) in the present disclosure. Rather, FIG. 19 is merely an example to illustrate the concept of a TE1 mode.

Figure 20:
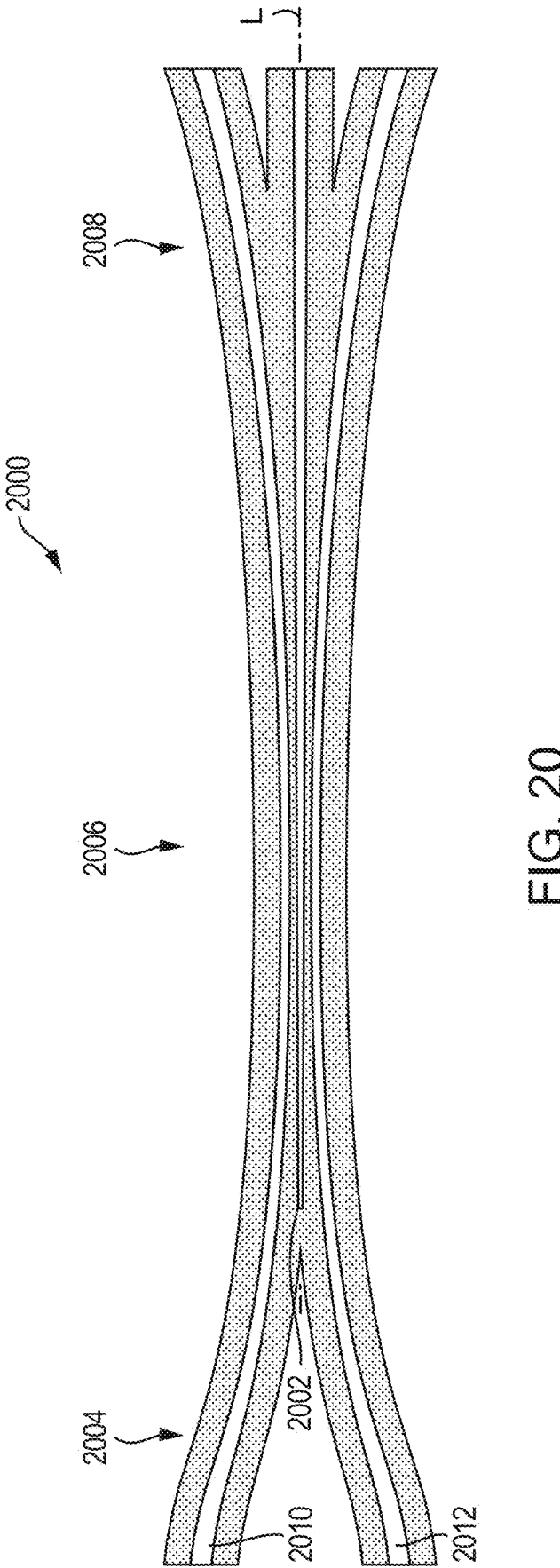
FIG. 20 is a schematic diagram showing an adiabatic 2×3 coupler wherein the center waveguide begins narrow at the left and widens to the right and wherein the outer waveguides begin wide at the left, narrow in the middle region, and widen to the right, according to at least one embodiment of the present disclosure.
Figure 21:
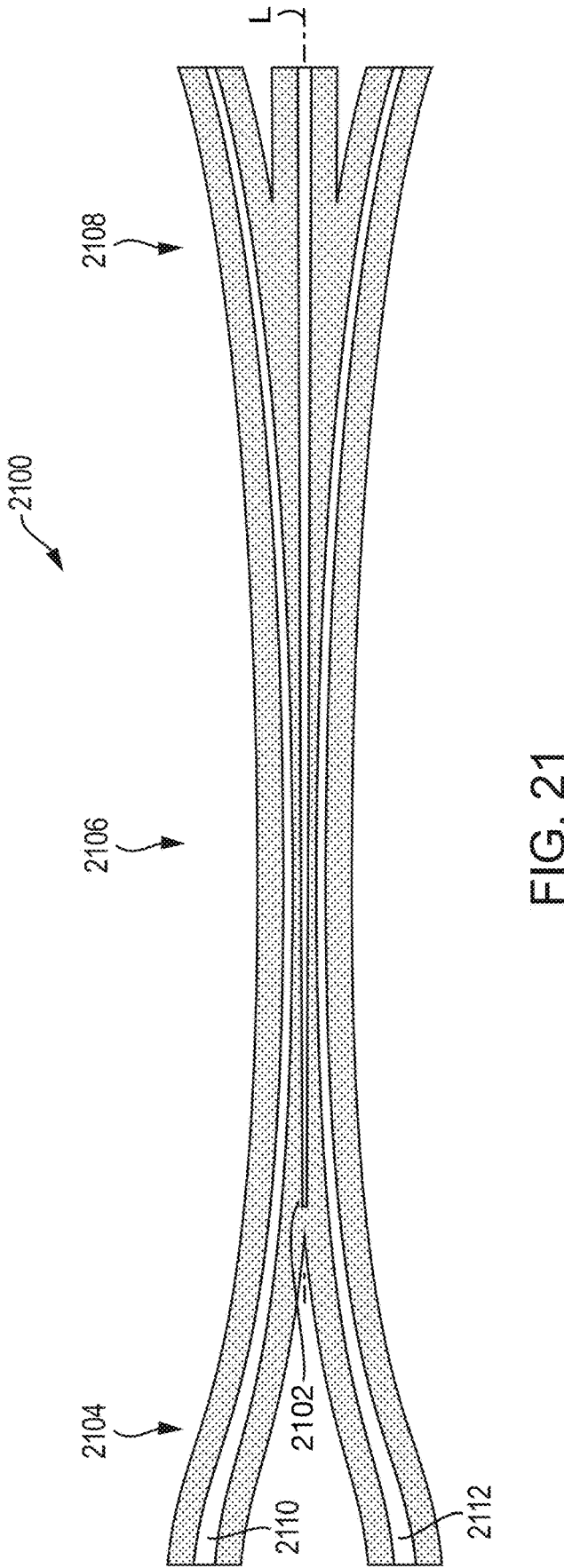
FIG. 21 is a schematic diagram showing an adiabatic 2×3 coupler wherein the center waveguide begins narrow at the left and widens to the right and wherein the outer waveguides begin wide at the left, narrow in the middle region, and remain narrow to the right, according to at least one embodiment of the present disclosure.
Figure 22:
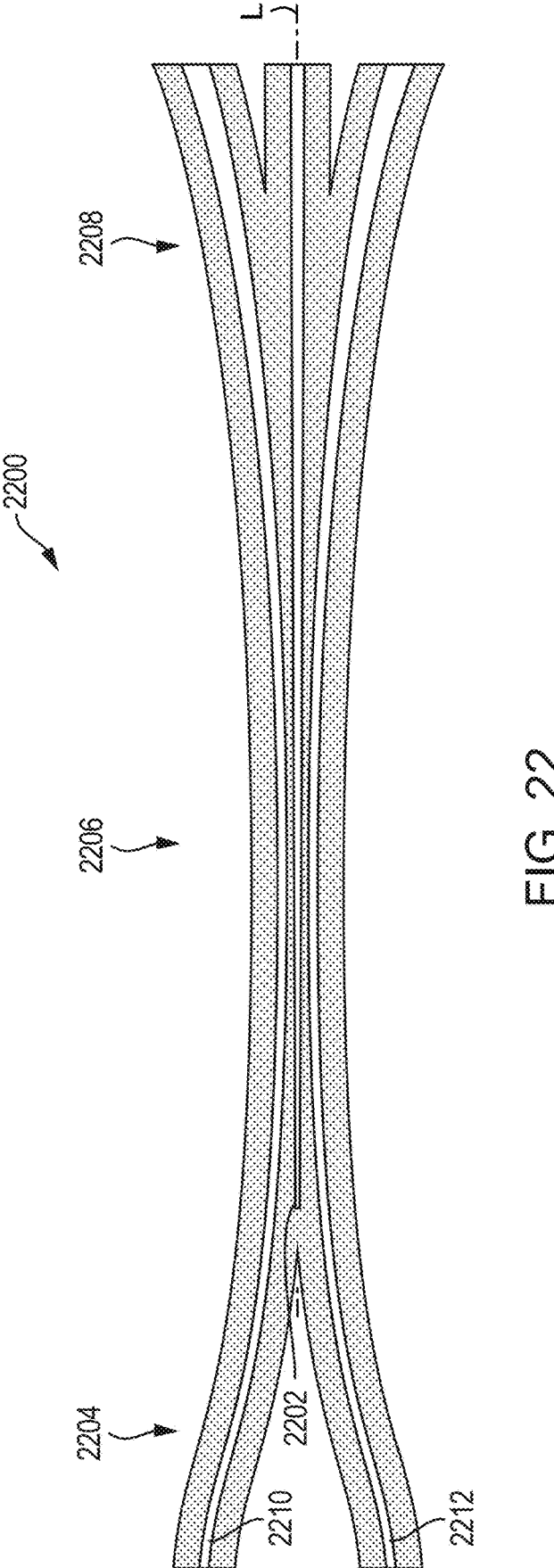
FIG. 22 is a schematic diagram showing an adiabatic 2×3 coupler wherein the center waveguide begins narrow at the left and widens to the right and wherein the outer waveguides begin narrow at the left, remain narrow in the middle region, and widen to the right, according to at least one embodiment of the present disclosure.
Figure 23:
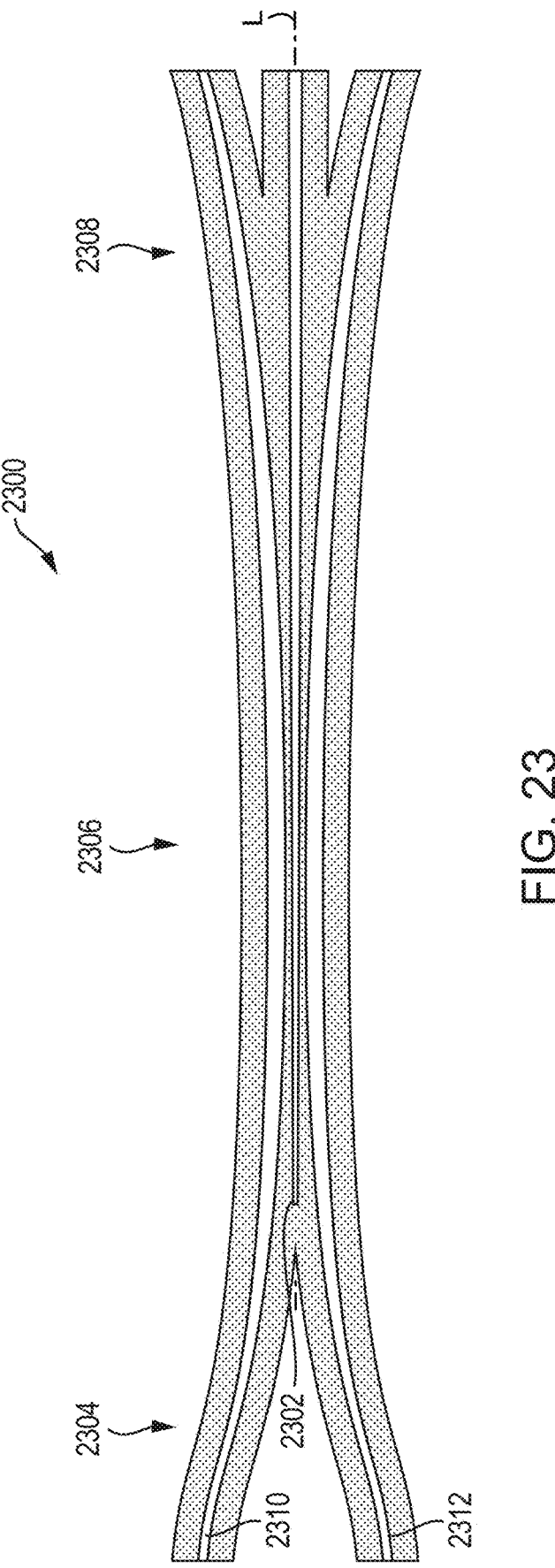
FIG. 23 is a schematic diagram showing an adiabatic 2×3 coupler wherein the center waveguide begins narrow at the left and widens to the right and wherein the outer waveguides begin narrow at the left, widen in the middle region, and narrow to the right, according to at least one embodiment of the present disclosure.
Figure 24:
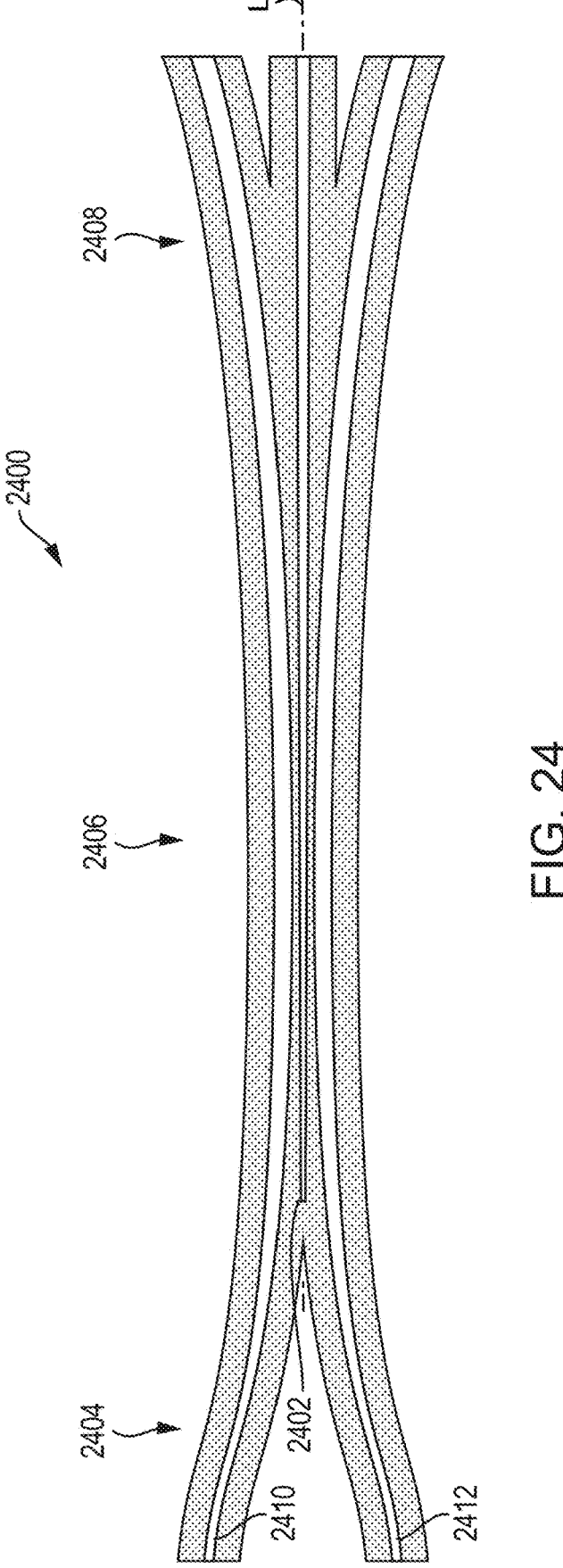
FIG. 24 is a schematic diagram showing an adiabatic 2×3 coupler wherein the center waveguide begins narrow at the left and widens to the right and wherein the outer waveguides begin narrow at the left, widen in the middle region, and remain widened to the right, according to at least one embodiment of the present disclosure.
Figure 25:
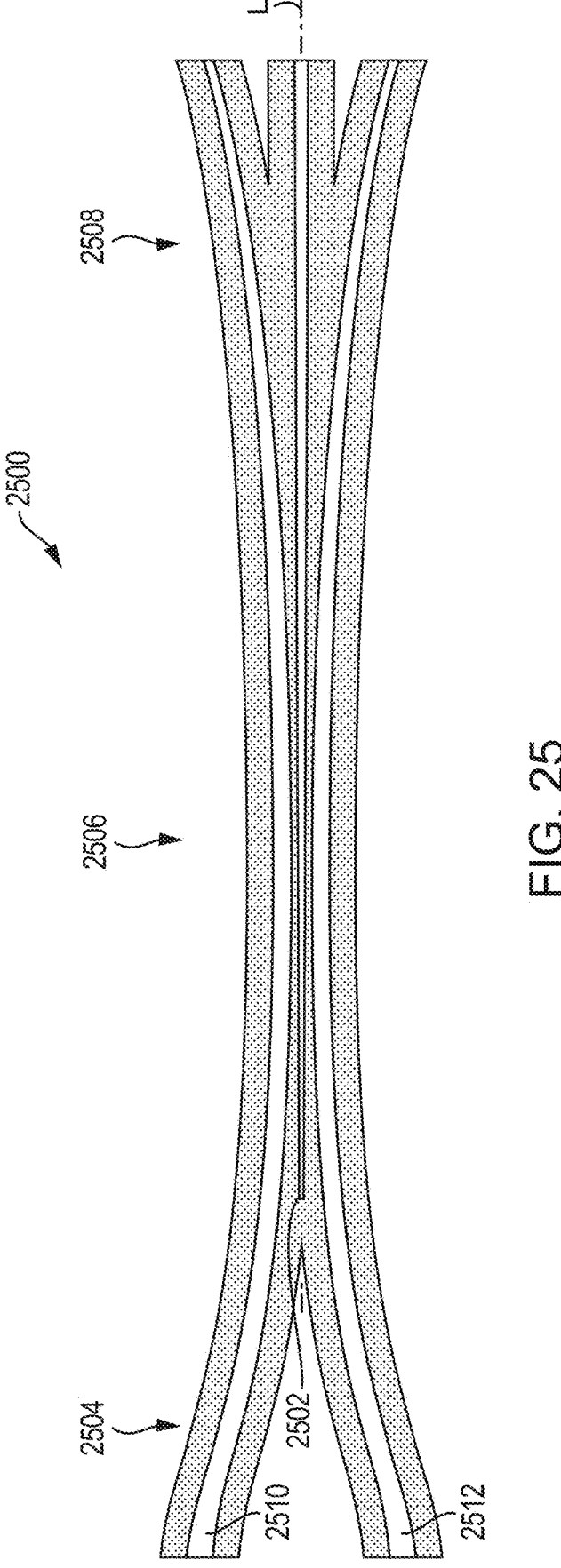
FIG. 25 is a schematic diagram showing an adiabatic 2×3 coupler wherein the center waveguide begins narrow at the left and widens to the right and wherein the outer waveguides begin wide at the left, remain wide in the middle region, and narrow to the right, according to at least one embodiment of the present disclosure.
Figure 26:
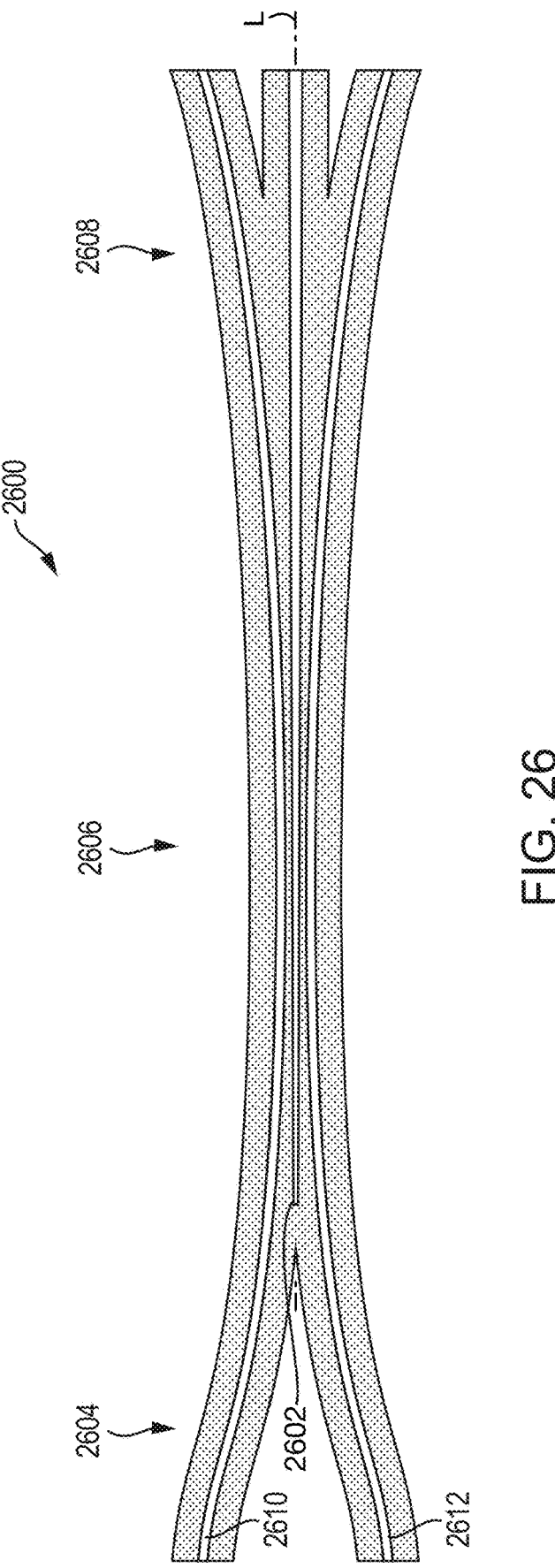
FIG. 26 is a schematic diagram showing an adiabatic 2×3 coupler wherein the center waveguide begins narrow at the left and widens to the right and wherein the outer waveguides remain uniform from left to right, according to at least one embodiment of the present disclosure.
Figure 27:
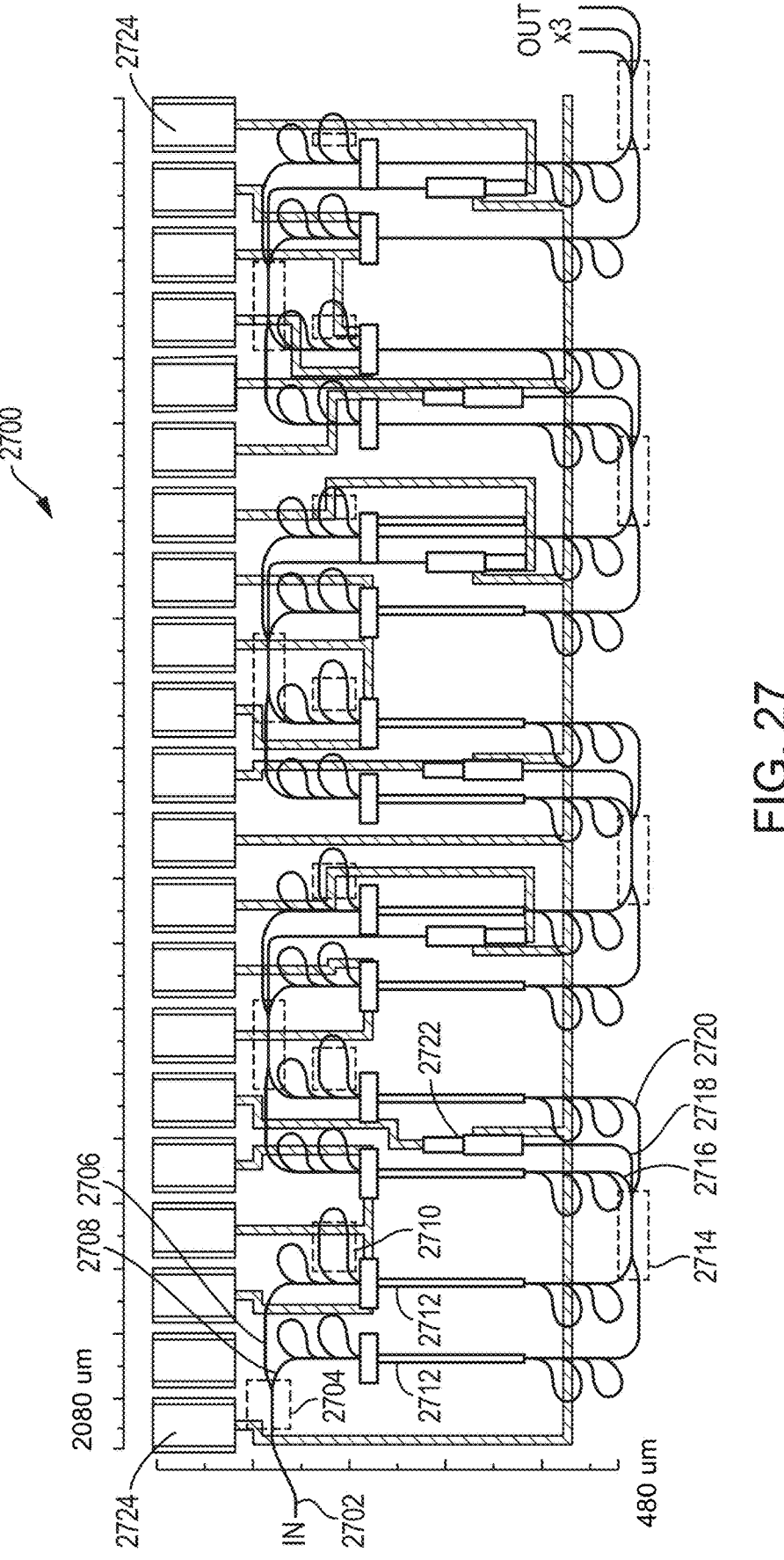
FIG. 27 is a schematic diagram showing the implementation of 2×3 interferometers, among other components, in a seven-stage MZI filter on a PIC.

FIG. 20 is a schematic diagram showing an adiabatic 2×3 coupler 2000, wherein the center waveguide, or third waveguide core, 2002 begins narrow at the tapered input region 2004 and widens to the flared output region 2008 and wherein the outer waveguides, or first and second waveguide cores, 2010 and 2012 begin wide at the tapered input region 2004, narrow in the narrow coupling region 2006, and widen to the flared output region 2008, according to at least one embodiment of the present disclosure. Now, with specific reference to the narrow coupling region 2006, the adiabatic 2×3 coupler 2000 is vertically symmetric about a herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP). In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifi- cally identified within the list of elements to which the phrase "at least one" refers, whether related or unrelated to those elements specifically identified.

What is claimed is:

1. An adiabatic optical coupler, comprising:
a tapered input region comprising a first waveguide core and a second waveguide core separated by a distance;
a narrow coupling region extending from the tapered input region, wherein the first waveguide core and the second waveguide core are brought into close proxim- ity, and wherein a third waveguide core is positioned between the first waveguide core and the second wave- guide core, the third waveguide core defining a longi- tudinal axis; and
a flared output region extending from the narrow coupling region, wherein the first waveguide core, the second waveguide core, and the third waveguide core are separated, wherein:
light entering the first waveguide core and the second waveguide core at the tapered input region comprises a TE0 mode (in-phase) component and a TE1 mode (out-of-phase) component, and
during a propagation of light, the TE0 mode (in-phase) component is routed to the third waveguide core and the TE1 mode (out-of-phase) component remains on the first waveguide core and the second waveguide core.

2. The adiabatic optical coupler of claim 1, wherein the narrow coupling region, power in the TE0 mode peaks along the longitudinal axis aligning with the third waveguide core, and power in the TE1 mode has a null along the longitudinal axis aligning with the third waveguide core and has two peaks above and below the longitudinal axis aligning with the first waveguide core and the second waveguide core.

3. The adiabatic optical coupler of claim 1, wherein the tapered input region, the narrow coupling region, and the flared output region are symmetric about the longitudinal axis.

4. The adiabatic optical coupler of claim 1, wherein the third waveguide core widens as it extends from the narrow coupling region to the flared output region.

5. The adiabatic optical coupler of claim 1, wherein the first waveguide core is a rib surrounded by a first slab portion and the second waveguide core is a rib surrounded by a second slab portion at the tapered input region; wherein the first waveguide core, the second waveguide core, and the third waveguide core are surrounded by a single slab portion at the narrow coupling region; and wherein the first wave- guide core is surrounded by a first slab portion, the second waveguide core is surrounded by a second slab portion, and the third waveguide core is a rib surrounded by a third slab portion at the flared output region.

6. A tunable optical filter system, comprising:
a system input;
a 1×2 input coupler, wherein the 1×2 input coupler receives light from the system input and splits the light into a first system input and a second system input;
a plurality of Mach-Zehnder interferometer (MZI) filter stages cascaded in series, each MZI filter stage com- prising:

a first path comprising a first path length;
a second path comprising a second path length, wherein the second path length is greater than the first path length; and
a 2×3 interferometer, wherein the 2×3 interferometer receives light from a first input and a second input, combines the light from the first input and the second input interferometrically into an in-phase combina- tion and an out-of-phase combination, and outputs half of the out-of-phase combination to a first output, the other half of the out-of-phase combination to a second output, and the in-phase combination to a third output;
wherein, at a first MZI filter stage, the first path receives light from the first system input and the second path receives light from the second system input, and wherein, any MZI filter stage subsequent to the first MZI filter stage, the first path receives light from the first output of a preceding MZI filter stage and the second path receives light from the second output of the preceding MZI filter stage;
wherein the 2×3 interferometer is an adiabatic optical coupler, comprising:
a tapered input region comprising a first waveguide core and a second waveguide core separated by a distance;
a narrow coupling region extending from the tapered input region, wherein the first waveguide core and the second waveguide core are brought into close proximity, and wherein a third waveguide core is positioned between the first waveguide core and the second waveguide core, the third waveguide core defining a longitudinal axis; and
a flared output region extending from the narrow coupling region, wherein the first waveguide core, the second waveguide core, and the third wave- guide core are separated,
wherein:
light entering the first waveguide core and the second waveguide core at the tapered input region comprises a TE0 mode (in-phase) com- ponent and a TE1 mode (out-of-phase) compo- nent, and
during a propagation of light, the TE0 mode (in- phase) component is routed to the third waveguide core and the TE1 mode (out-of-phase) component remains on the first waveguide core and the sec- ond waveguide core;
and
a system output, wherein the system output comprises the first output, the second output, and the third output of a final MZI filter stage.

7. The tunable optical filter system of claim 6, wherein the tunable optical filter further comprises at least one of a first phase shifter positioned over the first path and a second phase shifter positioned over the second path.

8. The tunable optical filter system of claim 6, wherein the third output transmits light to a monitor photodiode, and wherein the monitor photodiode is used to monitor and control phases of the transmitted light.

9. The tunable optical filter system of claim 6, wherein the tunable optical filter further comprises a plurality of elec- trical contact pads positioned in close proximity to the plurality of MZI filter stages cascaded in series.

10. The tunable optical filter system of claim 6, wherein the plurality of MZI filter stages cascaded in series further comprises 90-degree bends to reduce a required area on a chip.

11. An adiabatic optical coupler, comprising:

a tapered input region comprising a first waveguide core and a second waveguide core separated by a distance;

a narrow coupling region extending from the tapered input region, wherein the first waveguide core and the second waveguide core are brought into close proximity, and wherein a third waveguide core is positioned between the first waveguide core and the second waveguide core, the third waveguide core defining a longitudinal axis; and a flared output region extending from the narrow coupling region, wherein the first waveguide core, the second waveguide core, and the third waveguide core are separated, wherein the first waveguide core is a rib surrounded by a first slab portion and the second waveguide core is a rib surrounded by a second slab portion at the tapered input region; wherein the first waveguide core, the second waveguide core, and the third waveguide core are surrounded by a single slab portion at the narrow coupling region; and wherein the first waveguide core is surrounded by a first slab portion, the second waveguide core is surrounded by a second slab portion, and the third waveguide core is a rib surrounded by a third slab portion at the flared output region.

* * * * *